US012809673B2

(12) United States Patent
Banerjee et al.

(10) Patent No.: US 12,809,673 B2
(45) Date of Patent: Nov. 24, 2026

(54) PROVISIONING OF PERFORMANCE STATES FOR CENTRAL PROCESSING UNITS (CPUS)

(71) Applicant: Apple Inc., Cupertino, CA (US)

(72) Inventors: Ronit Banerjee, Mountain View, CA (US); Karthic A. Palaniappan, Cupertino, CA (US); Bryan R. Hinch, Campbell, CA (US); John G. Dorsey, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 458 days.

(21) Appl. No.: 18/367,710

(22) Filed: Sep. 13, 2023

(65) Prior Publication Data

US 2025/0086009 A1 Mar. 13, 2025

(51) Int. Cl.

| | |
|---|---|
| ***G06F 9/48*** | (2006.01) |
| ***G06F 1/3203*** | (2019.01) |
| ***G06F 1/3234*** | (2019.01) |
| ***G06F 9/50*** | (2006.01) |

(52) U.S. Cl.

CPC .......... *G06F 9/4887* (2013.01); *G06F 1/3203* (2013.01); *G06F 1/3234* (2013.01); *G06F 9/4893* (2013.01); *G06F 9/5044* (2013.01); *G06F 9/505* (2013.01)

(58) Field of Classification Search

None

See application file for complete search history.

(56) References Cited

U.S. PATENT DOCUMENTS

| | | | | |
|---|---|---|---|---|
| 2013/0097443 | A1 | 4/2013 | Li et al. | |
| 2015/0317762 | A1* | 11/2015 | Park | G06F 1/3296 345/505 |
| 2017/0261949 | A1 | 9/2017 | Hoffmann et al. | |

(Continued)

FOREIGN PATENT DOCUMENTS

| | | |
|---|---|---|
| EP | 3137965 B1 | 3/2017 |

OTHER PUBLICATIONS

International Search Report and Written Opinion directed to related International Application No. PCT/US2024/046376, mailed Dec. 17, 2024; 15 pages.

*Primary Examiner* — Qing Yuan Wu

(74) *Attorney, Agent, or Firm* — Sterne, Kessler, Goldstein & Fox P.L.L.C.

(57) ABSTRACT

Systems, methods, and apparatuses disclosed herein can operate in different performance states that provide different energy performance tradeoffs and, in some embodiments, can dynamically switch between these different performance states. These systems, methods, and apparatuses can estimate specific timeframes that workloads are to be completed. These systems, methods, and apparatuses can identify one or more processes that are being executed to perform the workloads. These systems, methods, and apparatuses can dynamically provision one or more performance states from among these different performance states to execute the process to complete the workloads within the specific timeframes. These systems, methods, and apparatuses can dynamically provision the one or more performance states for the one or more process that optimizes power consumption and/or performance while completing the workloads within the specific timeframes.

20 Claims, 5 Drawing Sheets

(56) References Cited

U.S. PATENT DOCUMENTS

| | | | |
|---|---|---|---|
| 2018/0260760 | A1 | 9/2018 | Srivastava et al. |
| 2018/0285750 | A1 | 10/2018 | Purushothaman et al. |
| 2020/0127812 | A1 | 4/2020 | Schuler et al. |

* cited by examiner

PROVISIONING OF PERFORMANCE STATES FOR CENTRAL PROCESSING UNITS (CPUS)

BACKGROUND

It has become increasingly difficult to compare the performance of central processing units (CPUs) by reviewing their specifications with recent advancements in computer architecture. Various benchmarking tests have been determined that allow comparison of different CPUs with respect to each other. The terms benchmarks, benchmarking, benchmark testing, or the like refer to tools designed to measure the performance of CPUs of electronic devices, such as mobile phones, mobile computing devices, mobile internet devices, tablet computers, laptop computers, video game consoles, portable media players, peripheral devices, internet capable appliances, and/or smart televisions, among others to provide some examples. These tools can run specific tasks or simulations that stress the CPUs to assess their performance. Often times, benchmarks are designed to mimic a particular type of workloads on the CPUs. These benchmarks can be classified as being synthetic benchmarks that execute specifically created programs that impose the workloads on the CPUs or application benchmarks that execute real-world programs, such as video games to provide an example, on the CPUs. These application benchmarks provide application benchmark scores that reflect the ability of the CPUs to handle real-work tasks of these real-world programs, such as video editing, three-dimensional graphical rendering and/or data analysis, among others. These application benchmark scores can be compared for different CPUs to compare performance of these different CPUs with respect to each other.

SUMMARY OF DISCLOSURE

Some embodiments of this disclosure describe a method for operating a Central Processing Unit (CPU). The method includes estimating specific timeframes that workloads are to be completed to determine workload completion windows; identifying a process that is performing workloads from among processes that are being executed by the CPU over workload completion windows; provisioning a performance state from among different performance states to execute the process to complete workloads over the workload completion windows; determining whether the plurality of workloads being performed by the process are deadline-bound workloads; and executing, based on determining the workloads are the deadline-bound workloads, the workloads in accordance with the performance state.

In some embodiments, the estimating can include identifying the specific timeframes that coincide with swapping between a visible buffer and a working buffer within a frame buffer of a Graphics Processing Unit (GPU).

In some embodiments, the identifying can include identifying candidate processes from among processes that are representative of deadline-bound workloads over workload completion windows; estimating workloads completed by candidate processes over workload completion windows; statistically measuring variances of workloads completed by candidate processes over workload completion windows; and identifying the process as being a candidate process from among candidate processes having a lowest variance from among variances.

In some embodiments, the provisioning can include provisioning the performance state that optimizes power consumption or performance of the CPU while completing workloads over the workload completion windows. In these embodiments, the provisioning can include provisioning the performance state that optimizes power consumption or performance of the CPU while completing workloads over the workload completion windows less a deadline margin.

In some embodiments, the method can further include switching, in response to determining a compute-bound workload, from the performance state to a utilization-based control for the process to perform the compute-bound workload; and executing the compute-bound workload in accordance with the utilization-based control. In these embodiments, the method can further include provisioning the performance state to execute the process to complete workloads over the workload completion windows in response to completing the compute-bound workload.

Some embodiments of this disclosure describe a computing device having a Graphics Processing Unit (GPU) and a Central Processing Unit (CPU). The GPU has a visible buffer to store a visible video frame that is being displayed and a working buffer to store a working video frame that is currently being prepared by the GPU. And the GPU can swap the visible buffer and the working buffer at specific timeframes in response to the working video frame being completed. The CPU can estimate specific timeframes that workloads are to be completed to determine workload completion windows, identify a process that is performing workloads from among processes that are being executed by the CPU over workload completion windows, provision a performance state from among different performance states to execute the process to complete workloads over the workload completion windows, determine that workloads being performed by the process are deadline-bound workloads, and execute, based on determining the workloads are the deadline-bound workloads, the workloads in accordance with the performance state.

In some embodiments, the CPU can identify the specific timeframes that coincide with swapping between the visible buffer and the working buffer.

In some embodiments, the CPU can identify candidate processes from among processes that are representative of deadline-bound workloads over workload completion windows; estimate workloads completed by candidate processes over workload completion windows; statistically measure variances of workloads completed by candidate processes over workload completion windows; and identify the process as being a candidate process from among candidate processes having a lowest variance from among variances.

In some embodiments, the CPU can provision the performance state that optimizes power consumption or performance of the CPU while completing workloads over the workload completion windows. In these embodiments, the CPU can provision the performance state that optimizes power consumption or performance of the CPU while completing workloads over the workload completion windows less a deadline margin.

In some embodiments, the CPU can switch, in response to determining a compute-bound workload, from the performance state to a utilization-based control for the process to perform the compute-bound workload; and execute the compute-bound workload in accordance with the utilization-based control. In these embodiments, the CPU can provision the performance state to execute the process to complete workloads over the workload completion windows in response to completing the compute-bound workload.

Some embodiments of this disclosure describe a System on Chip (SoC) having a Graphics Processing Unit (GPU), a memory, and a Central Processing Unit (CPU). The CPU can estimate specific timeframes that workloads are to be completed to determine workload completion windows, identify a process that is performing workloads from among processes that are being executed by the CPU over workload completion windows, provision a performance state from among different performance states to execute the process to complete workloads over the workload completion windows, determine that workloads being performed by the process are deadline-bound workloads, and execute, based on determining the workloads are the deadline-bound workloads, the workloads in accordance with the performance state.

In some embodiments, the CPU can identify the specific timeframes that coincide with swapping between a visible buffer and a working buffer within a frame buffer of the GPU.

In some embodiments, the CPU can identify candidate processes from among processes that are representative of deadline-bound workloads over workload completion windows; estimate workloads completed by candidate processes over workload completion windows; statistically measure variances of workloads completed by candidate processes over workload completion windows; and identify the process as being a candidate process from among candidate processes having a lowest variance from among variances.

In some embodiments, the CPU can provision the performance state that optimizes power consumption or performance of the CPU while completing workloads over the workload completion windows. In these embodiments, the CPU can provision the performance state that optimizes power consumption or performance of the CPU while completing workloads over the workload completion windows less a deadline margin.

In some embodiments, the CPU can switch, in response to determining a compute-bound workload, from the performance state to a utilization-based control for the process to perform the compute-bound workload; and execute the compute-bound workload in accordance with the utilization-based control. In these embodiments, the CPU can provision the performance state to execute the process to complete workloads over the workload completion windows in response to completing the compute-bound workload.

This Summary is provided merely for illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the disclosure and, together with the description, further serve to explain the principles of the disclosure and enable a person of skill in the relevant art(s) to make and use the disclosure.

Figure 1:
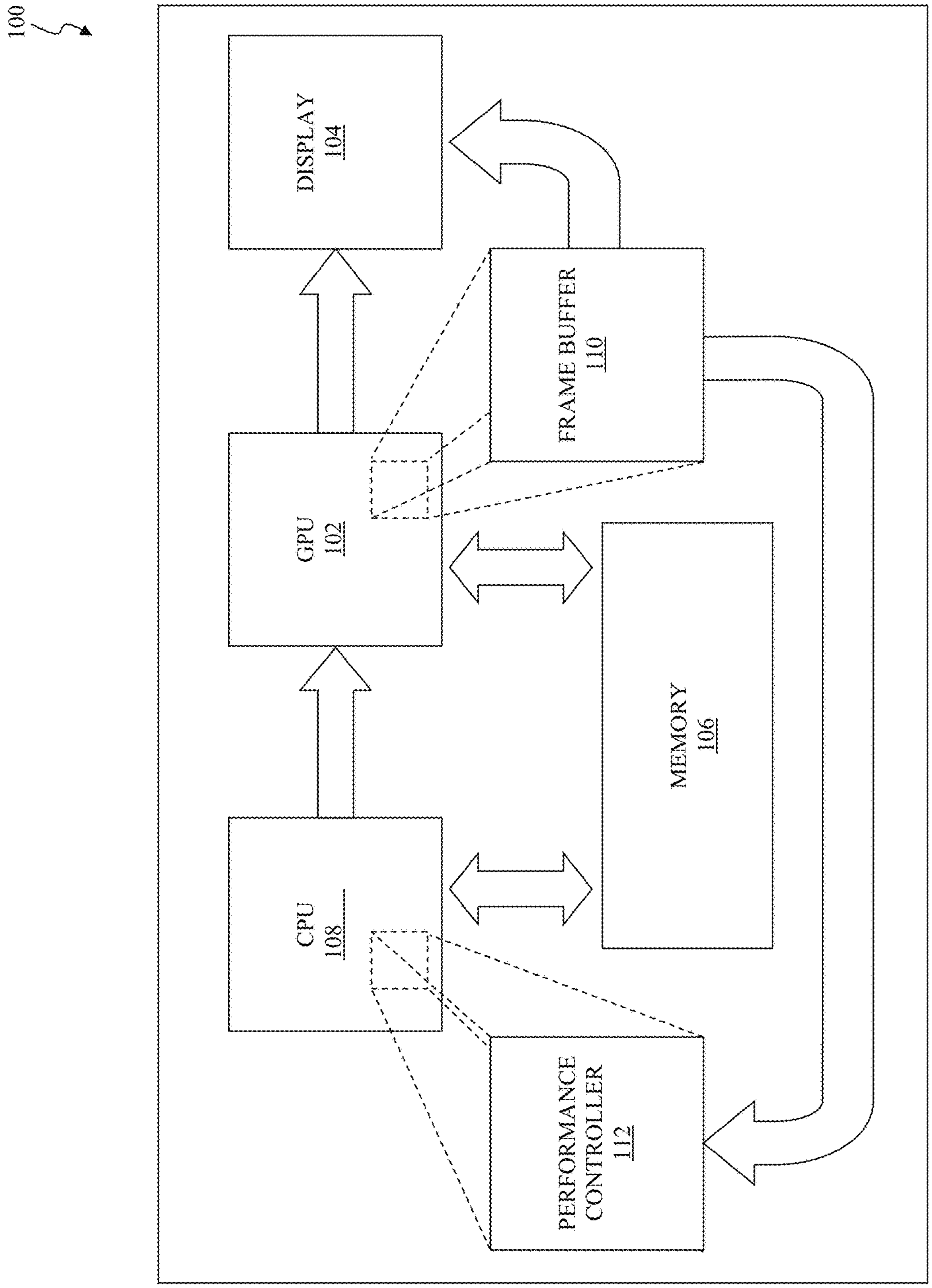
FIG. 1 graphically illustrates an exemplary computing device in accordance with various embodiments of the present disclosure.

The disclosure is described with reference to the accompanying drawings. In the drawings, like reference numbers can indicate identical or functionally similar elements. Additionally, generally, the left-most digit(s) of a reference number identifies the drawing in which the reference number first appears.

DETAILED DESCRIPTION

Exemplary Workloads of Exemplary Processor

Before describing an exemplary processor, such as an exemplary central processing unit (CPU) to provide an example, workloads of this exemplary processor are to be generally described. The workloads refer to the amount of processing, computing, and/or data handling, among others that is expected to be executed by the exemplary processor. The workloads of the exemplary processor can encompass processes, tasks, operations, demands, threads, or the like that are placed on the resources of the exemplary processor, such as processing power, clock speed, number of cores, and/or cache memory, among others to provide some examples. The workloads of the exemplary processor can vary widely, from simple workloads such as word processing, to complex workloads such as video rendering, scientific simulations, and/or database queries, among others. In some embodiments, the complex workloads can include deadline-bound workloads and/or compute-bound workloads. The deadline-bound workloads refer to workloads that need to be completed within specific timeframes. These workloads are often time sensitive and can require careful planning and execution to ensure that they are finished on time. Examples of the deadline-bound workloads can include real-time simulation, video rendering, audio synthesis, and/or network packet processing, among others. The compute-bound workloads refer to workloads that are primarily limited by the resources of the exemplary processor. The overall performance of the compute-bound workloads is often constrained by the speed at which the exemplary processor can execute these workloads.

Overview

Systems, methods, and apparatuses disclosed herein can operate in different performance states that provide different energy performance tradeoffs and, in some embodiments, can dynamically switch between these different performance states. These systems, methods, and apparatuses can estimate specific timeframes that workloads are to be completed. These systems, methods, and apparatuses can identify one or more processes that are being executed to perform the workloads. These systems, methods, and apparatuses can dynamically provision one or more performance states from among these different performance states to execute the process to complete the workloads within the specific timeframes. These systems, methods, and apparatuses can dynamically provision the one or more performance states for the one or more process that optimizes power consumption and/or performance while completing the workloads within the specific timeframes.

Exemplary Electronic Device

FIG. 1 graphically illustrates an exemplary computing device in accordance with various embodiments of the present disclosure. In the exemplary embodiment illustrated in FIG. 1, a computing device 100 can operate in different performance states that provide different energy performance tradeoffs and, in some embodiments, can dynamically switch between these different performance states. In some embodiments, the computing device 100 can execute dynamic voltage and frequency management (DVFM) to optimize power consumption and/or performance to operate in a particular performance state. In these embodiments, the computing device 100 can determine its performance state based on the workloads placed on its resources, such as processing power, clock speed, number of cores, and/or cache memory, among others to provide some examples. A key challenge in provisioning the one or more performance states from among these different performance states is to provision the one or more performance states with the correct energy-performance tradeoff. The energy-performance tradeoff is often tailored to the workloads and/or performance requirements for the computing device 100, such as frequency requirements, response time requirements, transition time requirements, energy efficiency requirements, peak performance requirements, and/or steady-state performance requirements, among others to provide some examples. As an example, for video games, the computing device 100 is to complete deadline-bound workloads within the specific timeframes, for example, every approximately sixteen (16) milliseconds (ms) to achieve a frame rate of sixty (60) frames per second (FPS), otherwise the computing device 100 can experience frame loss. Frame loss occurs when the computing device 100 cannot successfully complete the deadline-bound workloads within the specific timeframes, for example, every approximately sixteen (16) ms, resulting in frames of data being dropped. Often times, frame loss can result in stuttering, input lag, visual glitches, and/or immersion breakage, among others. As to be described in further detail below, the computing device 100 can monitor the workloads placed on the resources of the computing device 100. In some embodiments, the computing device 100 can thereafter dynamically provision the one or more performance states having the correct energy-performance tradeoff from among the different performance states based upon these workloads.

In the exemplary embodiment illustrated in FIG. 1, the computing device 100 can include a Graphics Processing Unit (GPU) 102, a display 104, a memory 106, and a Central Processing Unit (CPU) 108. In some embodiments, the GPU 102, the memory 106, and/or the CPU 108, can be implemented together as a System on Chip (SoC). In these embodiments, the SoC and/or the display 104 can be implemented as a standalone electrical, mechanical, and/or electromechanical device, or a discrete device, and/or can be incorporated within or coupled to another electrical, mechanical, and/or electromechanical device, or a host device, such as a consumer electronics device, a cellular phone, a smartphones, a feature phone, a tablet computer, a wearable computer device, a personal digital assistant (PDAs), a wireless handset, a desktop computer, a laptop computer, an in-vehicle infotainment (IVIs), an in-car entertainment (ICE) device, an Instrument Cluster (IC), a head-up display (HUD) device, an onboard diagnostic (OBD) device, a dashtop mobile equipment (DME), a mobile data terminal (MDT), an Electronic Engine Management System (EEMS), an electronic/engine control units (ECU), an electronic/engine control modules (ECM), an embedded system, an engine management system (EMS), a networked or "smart" appliance, a Machine-Type-Communication (MTC) device, a Machine-to-Machine (M2M) device, a Internet of Things (IoT) device, and the like. In some embodiments, the SoC can include a display controller (not shown) to control the overall configuration and/or operation of the display 104 in displaying video frames generated by the GPU 102. Although the discussion to follow is to describe the computing device 100 in terms of the GPU 102 and the CPU 108, those skilled in the relevant art(s) will recognize that the teachings herein are equally applicable to other processors, such as a digital signal processor, and/or a tensor processing unit (TPU); and/or other coprocessors, such as a math coprocessor, an input/output (I/O) processor, a network coprocessor, a security coprocessor, and/or a cryptographic coprocessor to provide some examples, without departing from the spirt and scope of the present disclosure.

In the exemplary embodiment illustrated in FIG. 1, the GPU 102 represents a secondary, or auxiliary, processor, of the computing device 100 that can accelerate rendering and/or manipulation of images, videos, and other graphic-related tasks. The GPU 102 can sometimes be referred to as a coprocessor. In some embodiments, the GPU 102 can execute graphic intensive operations, such as matrix calculations, texture mapping, lighting effects, and/or rendering polygons, among others to provide some examples. Although not illustrated in FIG. 1, the GPU 102 can include multiple processing cores that execute instructions in parallel, a memory that stores information for the multiple processing cores, texture units to sample and to filter textures for images, videos, and other graphic-related tasks, rasterizers to convert three-dimensional images, videos, and other graphic-related tasks to two-dimensional images, videos, and other graphic-related tasks, a texture cache to store frequently access texture data, and/or geometry shaders to process geometry data for images, videos, and other graphic-related tasks to provide some examples. As illustrated in FIG. 1, the GPU 102 can further include a frame buffer 110 to store video frames to be displayed by the display 104. In some embodiments, the frame buffer 110 can include a front buffer, also referred to as a visible buffer, and a back buffer, also referred to as a working buffer. In these embodiments, the visible buffer can include a visible video frame that is currently being displayed by the display 104 as to be described in further detail below and the working buffer can include a working video frame that is currently being prepared by the GPU 102 and/or the CPU 108 for display by the display 104. After completing the working video frame in the working buffer, the GPU 102 can swap the visible buffer and the working buffer. In some embodiments, the working buffer becomes a new visible buffer to display the working video frame that has been prepared in the previous working buffer and the visible buffer becomes a new working buffer to prepare a new working video frame for display by the display 104. In some embodiments, the frame buffer 110 can notify the CPU 108 of these swaps between the visible buffer and the working buffer. And as to be described in further detail below, the CPU 108 can use these notifications of these swaps to determine workload completion windows that can be used monitor the workloads placed on the resources of the computing device 100.

In the exemplary embodiment illustrated in FIG. 1, the display 104 receives video frames having images, text, and/or video from the GPU 102 for display. In some embodiments, the display 104 can include an electronic visual display to display the images, the text, and/or the video. In some embodiments, the electronic visual display can include a liquid crystal display (LCD), an electro-luminescence (EL) display, an inorganic light emitting diode LED display, an organic LED (OLED) display, a plasma display panel, and/or any other suitable electronic visual display that will be recognized by those skilled in the relevant art(s) without departing from the spirit and scope of the present disclosure. In these embodiments, the display 104 can be implemented as a standalone electrical, mechanical, and/or electromechanical device, or a discrete device, and/or can be incorporated within or coupled to the other electrical, mechanical, and/or electromechanical device, or the host device, examples of which have described above.

In the exemplary embodiment illustrated in FIG. 1, the memory 106 represents a storage area for the computing device 100 to store instructions and/or data. In some embodiments, the memory 106 can include a main memory to store, for example, programming instructions, data, and/or results to be accessed by the GPU 102 and/or the CPU 108, and a secondary memory to store, for example, data and programs for later retrieval, such as the operating system, applications, documents and files, media content, archived data, installers, system files and configurations, and/or software updates, among others. In some embodiments, the main memory can include, but is not limited to, read only memory (ROM); random access memory (RAM); magnetic disk storage media; optical storage media; flash memory devices; and/or others to provide some examples. Alternatively, or in addition to, the secondary memory can include hard disk drives, for example, solid-state drives, floppy disk drives along with associated removable media, CD-ROM drives, optical drives, flash memories, and/or removable media cartridges.

In the exemplary embodiment illustrated in FIG. 1, the CPU 108 represents a primary, or main, processor of the computing device 100 to process, calculate, and/or control instructions from a computer program, such as arithmetic, logic, controlling, and input/output (I/O) instructions to provide some examples. Although not illustrated in FIG. 1, the CPU 108 can include a control unit (CU) to manage and/or to coordinate the execution of the instructions, an arithmetic logic unit (ALU) to execute arithmetic and/or logic operations on binary integer numbers from instructions provided by the CU, a register to store data, often temporary, for processing, a cache memory to store frequently accessed data and instructions, an instruction decoder to interpret instructions for the ALU, and/or a floating point unit (FPU) to execute arithmetic and logic operations on floating point numbers from the instructions provided by the CU to provide some examples.

In the exemplary embodiment illustrated in FIG. 1, the CPU 108 can operate in different performance states that provide different energy performance tradeoffs and, in some embodiments, dynamically switch between these different performance states. As illustrated in FIG. 1, the CPU 108 can include a performance controller 112 to monitor workloads placed on the resources of the computing device 100 and/or performance requirements placed on the CPU 108, such as frame rate, frame time, load time, latency, render resolution, texture quality, graphic settings, utilization, and/or memory usage, among others. In some embodiments, the performance controller 112 can include a closed-loop performance controller (CLPC); however, other performance controllers are possible for the performance controller 112 as will be recognized by those skilled in the relevant art(s) without departing from the spirit and scope of the present disclosure. In some embodiments, the performance controller 112 can dynamically provision the CPU 108 to operate in one or more performance states from among these different performance states. In these embodiments, these performance states can have the correct energy-performance tradeoff from among the different performance states based upon the workloads and/or the performance requirements. In these embodiments, the performance controller 112 can execute dynamic voltage and frequency management (DVFM) to provision the one or more performance states to optimize power consumption and/or performance of the CPU 108 as to be described in further detail below.

As part of the DVFM, the performance controller 112 can estimate specific timeframes that the workloads are to be completed to determine workload completion windows. As to be described in further detail below, these workload completion windows can be used to monitor the workloads being executed by the CPU 108. In some embodiments, the performance controller 112 can estimate one or more target performance requirements for the workloads, such as target frame rate, expressed in frames per second (FPS), target frame time, target load time, target latency, target render resolution, target texture quality, target graphic settings, target utilization, and/or target memory usage, among others. In some embodiments, the one or more target performance requirements can impose implicit constraints on the specific timeframes to complete the workloads. In these embodiments, the performance controller 112 can utilize these implicit constraints on the specific timeframes to complete the workloads to determine the workload completion windows. As discussed above, the GPU 102 can further include the frame buffer 110 including the front buffer, also referred to as the visible buffer, and the back buffer, also referred to as the working buffer. In some embodiments, the swaps between the visible buffer and the working buffer, as described above, can coincide with the specific timeframes that the workloads are to be completed. In these embodiments, the frame buffer 110 can notify the performance controller 112 of these swaps between the visible buffer and the working buffer as described above to determine the workload completion windows. In these embodiments, the performance controller 112 can determine the workload completion windows that have starting points and/or ending points that coincide with the swaps between the visible buffer and the working buffer. For example, a first swap between the visible buffer and the working buffer can represent a starting point for the workload completion windows to begin the workloads and a second swap between the visible buffer and the working buffer can represent an ending point for the workload completion windows to complete the workloads.

After determining the workload completion windows, the performance controller 112 can identify one or more processes, tasks, operations, demands, threads, or the like, simply referred to as one or more processes for convenience, that are being executed by the CPU 108 to perform the workloads. In some embodiments, the CPU 108 can execute multiple processes to perform multiple workloads that are placed on the resources of the computing device 100. In these embodiments, the performance controller 112 can identify the one or more processes that are being executed by the CPU 108 to perform the workloads from among the multiple processes that are being executed by the CPU 108. In some embodiments, the performance controller 112 can analyze the multiple processes to perform the multiple workloads over the workload completion windows to identify one or more candidate processes that are representative of the deadline-bound workloads over the workload completion windows. In these embodiments, the performance controller 112 can estimate the workloads completed by the one or more candidate processes over the workload completion windows in terms of, for example, availability, response time, processing speed, channel capacity, latency, completion time, service time, bandwidth, throughput, relative efficiency, scalability, power consumption, and/or compression ratio, among others. In some embodiments, the performance controller 112 can statistically measure the workloads completed by the one or more candidate processes over the workload completion windows, in terms of, for example, a mean, a median, a mean square, a root mean square, a variance, and/or a norm, among others, to identify the one or more processes that are being executed by the CPU 108 to perform the workloads. In these embodiments, the performance controller 112 can compare these statistics for the workloads completed by the one or more candidate processes over the workload completion windows with a deadline-bound workloads threshold to identify the one or more processes that are being executed by the CPU 108 to perform the deadline-bound workloads. For example, the deadline-bound workloads can be characterized as having a low variance for the workloads completed over the workload completion windows. In this example, the performance controller 112 can identify those processes from among the one or more candidate processes with the lowest variances, for example, less than approximately five (5) percent, as being the one or more processes that are being executed by the CPU 108 to perform the deadline-bound workloads.

After identifying the one or more processes, the performance controller 112 can dynamically provision the one or more performance states that can be implemented by the CPU 108 to execute the one or more processes to complete the workloads within the specific timeframe. In some embodiments, the performance controller 112 can dynamically provision the one or more performance states having the correct energy-performance tradeoff, as described above, to perform the workloads. In some embodiments, the performance controller 112 can dynamically provision the one or more performance states for the one or more processes that optimize power consumption and/or performance of the CPU 108 while completing the workloads within the specific timeframe. Alternatively, or in addition to, the performance controller 112 can dynamically provision the one or more performance states for the one or more processes that optimize power consumption and/or performance of the CPU 108 while completing the workloads within the specific timeframes less a deadline margin, for example, twenty (20) percent. In these embodiments, the deadline margin can allow for fluctuations in completing the workloads while avoiding the frame loss. In the exemplary embodiment illustrated in FIG. 1, the performance controller 112 can access an organized collection of data, often referred to as a database, to identify the one or more performance states having the correct energy-performance tradeoff from among the different performance states. In these embodiments, the database may include one or more data tables having various data values, such as alphanumeric strings, integers, decimals, floating points, dates, times, binary values, Boolean values, and/or enumerations to provide some examples. In these embodiments, the database can be a columnar database, a relational database, a key-store database, a graph database, and/or a document store to provide some examples. In some embodiments, the work completed by the one or more processes to perform the workloads are related to the operating frequency used by the CPU 108 to execute the one or more processes and the time needed for the CPU 108 to complete the workloads using the operating frequency. In these embodiments, the work completed by the one or more processes to perform the workloads can be characterized as being relatively constant across the workload completion windows. In these embodiments, the database can store different times needed for the one or more processes to complete the workloads at different operating frequencies of the CPU while maintaining the work completed by the one or more processes to perform the workloads as a constant. In these embodiments, the performance controller 112 can index the database with a first performance state having a first operating frequency used by the CPU 108 to execute the one or more processes to perform the workloads and a first time needed for execute the one or more processes to complete the workloads and a second time of a second performance state that the one or more processes are to complete the workloads. In these embodiments, the database can return a second operating frequency of the second performance state to be used by the CPU 108 to complete the workloads within the second time. In some embodiments, the performance controller 112 can dynamically provision the CPU 108 to operate at the second performance state utilizing the second operating frequency to execute the one or more processes to complete the workloads within the second time.

After dynamically provisioning the one or more performance states, the CPU 108 can implement the one or more performance states to execute the one or more processes to complete the workloads within the specific timeframe. In some embodiments, the performance controller 112 can monitor the one or more processes that are being executed by the CPU 108 to verify that the workloads are the deadline-bound workloads. As described above, the workloads that are placed on the resources of the computing device 100 can be the deadline-bound workloads or the compute-bound workloads. In some embodiments, the performance controller 112 can monitor the workloads being placed on the resources of the computing device 100 to determine whether these workloads are the deadline-bound workloads or the compute-bound workloads. In some embodiments, the performance controller 112 can monitor the CPU only workloads, also referred to as CPU serialization, to determine whether the workloads that are placed on the resources of the computing device 100 are the compute-bound workloads. In these embodiments, the one or more processes to perform the workloads can be executed by the GPU 102 only, the CPU 108 only, and/or a combination of the GPU 102 and the CPU 108. In these embodiments, the performance controller 112 can compare a percentage of time that the one or more processes are executed by the CPU 108 only to the total workloads to be performed by the computing device 100 to determine whether the workloads being executed by the one or more processes are the compute-bound workloads. In these embodiments, the performance controller 112 can compare the percentage of time to a variable threshold, for example, ninety (90) percent, to determine whether the workloads being executed by the one or more processes are the compute-bound workloads. After determining the workloads to be the compute-bound workloads, the performance controller 112 can switch from the one or more performance states to a utilization-based control to complete the compute-bound workloads. In some embodiments, the utilization-based control involves dynamically provisioning the resources of the computing device 100 based upon their usage. For example, if the usage of the resources of the computing device 100 is high, for example, near one hundred (100) percent utilization, the performance controller 112 can allocate more resources to critical tasks or processes. Otherwise, the performance controller 112 might throttle down certain processes to save power or allocate resources to other tasks. After completing the compute-bound workloads, the performance controller 112 can once again dynamically provision the one or more performance states that can be implemented by the CPU 108 to execute the one or more processes to complete the workloads within the specific timeframes as described above, and continue to monitor the one or more processes that are being executed by the CPU 108 to verify that the workloads are the deadline-bound workloads. Alternatively, after determining the workloads to be the deadline-bound workloads, the one or more processes can execute the one or more processes to complete the workloads within the specific timeframes to complete the workloads within the specific timeframe.

Figure 2:
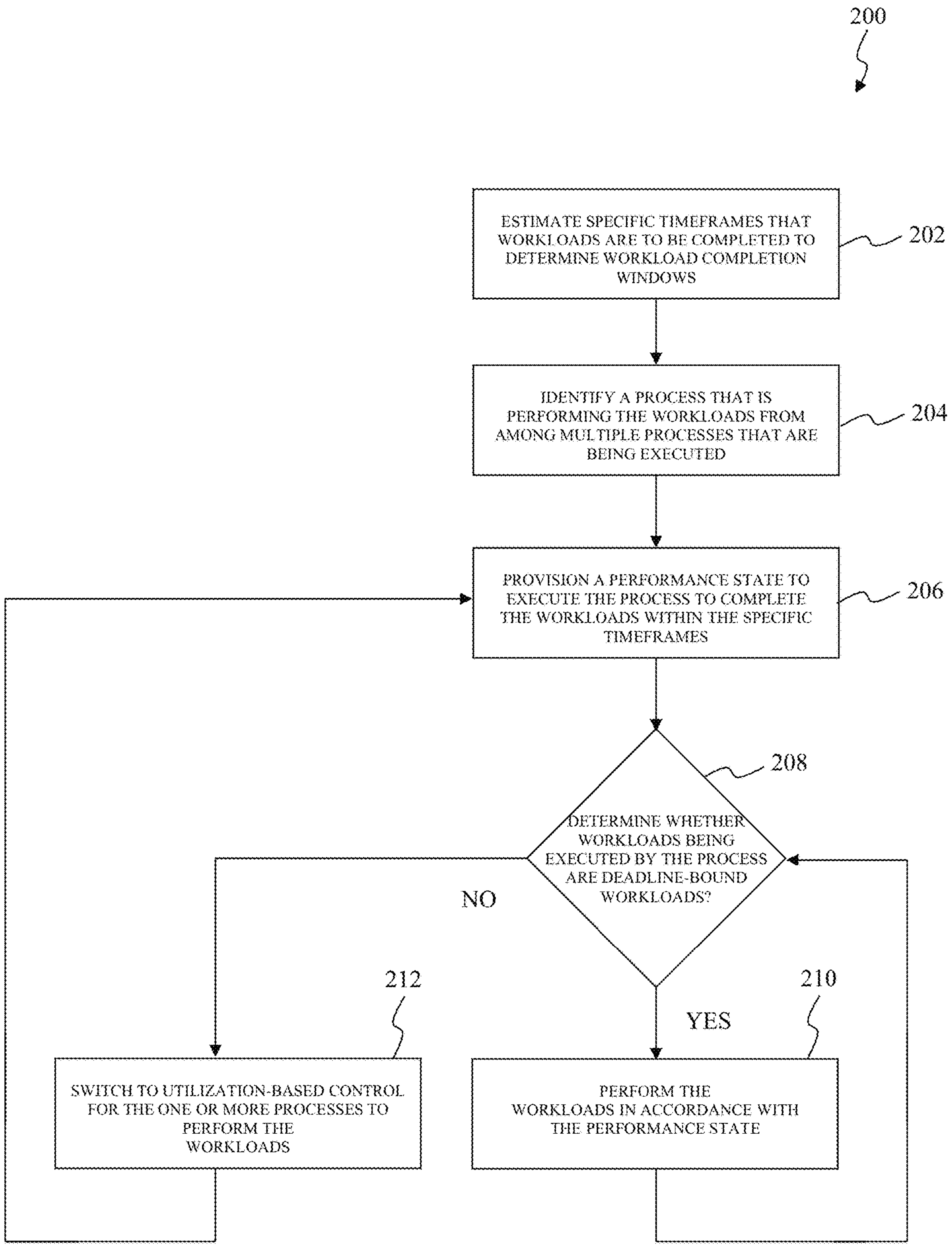
FIG. 2 illustrates a flowchart of an exemplary operation of an exemplary central processing unit (CPU) within the exemplary electronic device in accordance with various embodiments of the present disclosure.

Exemplary Operation of an Exemplary Central Processing Unit (Cpu) within the Exemplary Electronic Device FIG. 2 illustrates a flowchart of an exemplary operation of an exemplary central processing unit (CPU) within the exemplary electronic device in accordance with various embodiments of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 200 for executing one or more processes for completing workloads within specific timeframes. The operational control flow 200 can be executed by one or more processors, such as the CPU 108 as described above to provide an example.

At operation 202, the operational control flow 200 can estimate specific timeframes that the workloads are to be completed to determine workload completion windows. In some embodiments, the operational control flow 200 can estimate one or more target performance requirements for the workloads, such as target frame rate, expressed in frames per second (FPS), target frame time, target load time, target latency, target render resolution, target texture quality, target graphic settings, target utilization, and/or target memory usage, among others. In some embodiments, the one or more target performance requirements can impose implicit constraints on the specific timeframes to complete the workloads. In these embodiments, the operational control flow 200 can utilize these implicit constraints on the specific timeframes to complete the workloads to determine the workload completion windows in a substantially similar manner as described above. For example, the workloads can include video rendering workloads for a video game that generates video frames to be displayed by a display, such as the display 104 to provide an example. In this example, the video game being executed by the operational control flow 200 can specify a target frame rate of sixty (60) FPS to generate the video frames. As such, the operational control flow 200 is to generate one video frame approximately every sixteen (16) milliseconds (ms) to satisfy the target frame rate of sixty (60) FPS. In this example, the operational control flow 200 can use these approximately every sixteen (16) ms timeframes to determine the workload completion windows to monitor the workloads. In some embodiments, the operational control flow 200 can receive notifications of swaps between a visible buffer and a working buffer of a GPU, such as the GPU 102 to provide an example. In these embodiments, the operational control flow 200 can determine the workload completion windows that have starting points and/or ending points that coincide with the swaps between the visible buffer and the working buffer. For example, a first swap between the visible buffer and the working buffer can represent a starting point for the workload completion windows to begin the workloads and a second swap between the visible buffer and the working buffer can represent an ending point for the workload completion windows to complete the workloads.

At operation 204, the operational control flow 200 can identify a process, a task, an operation, a demand, a thread, or the like, simply referred to as a process for convenience, that is being executed by the one or more processors to perform the workloads. In some embodiments, the operational control flow 200 can identify the process that is being executed by the one or more processors to perform the workloads from among multiple processes that are being executed by the one or more processors in a substantially similar manner as described above. From the example above, the operational control flow 200 can identify the process that is being executed by the one or more processors to execute the video rendering workloads for the video game from among multiple processes that are being executed by the one or more processors, such as word processing, web browsing, email clients, spreadsheet software, media players, text editors, programming integrated development environments (IDEs), file compression/decompression tools, security software, operating system utilities, video games, three-dimensional modeling and rendering software, video editing software, machine learning and deep learning, scientific simulations, and/or cryptocurrency mining, among others. In this example, the operational control flow 200 can analyze these multiple processes over the workload completion windows from operation 202 to identify one or more candidate processes that include the video rendering workloads for the video game and other processes, such as three-dimensional modeling and rendering software, video editing software, machine learning and deep learning, scientific simulations, and/or cryptocurrency mining, among others, that are representative of the deadline-bound workloads over the workload completion windows from operation 202. In these embodiments, the operational control flow 200 can estimate the workloads completed by the one or more candidate processes over the workload completion windows from operation 202 in terms of, for example, availability, response time, processing speed, channel capacity, latency, completion time, service time, bandwidth, throughput, relative efficiency, scalability, power consumption, and/or compression ratio, among others. From the above example, the operational control flow 200 can measure the average work completed by the video rendering workloads over the workload completion windows from operation 202 for the video game and the other processes, such as the three-dimensional modeling and rendering software, the video editing software, the machine learning and deep learning, the scientific simulations, and/or the cryptocurrency mining, among others. In some embodiments, the operational control flow 200 can statistically measure the workloads completed by the one or more candidate processes over the workload completion windows from operation 202, in terms of, for example, a mean, a median, a mean square, a root mean square, a variance, and/or a norm, among others, to identify the one or more processes that are being executed by the one or more processors to perform the workloads. From the above example, the operational control flow 200 can measure the variances of average work completed by the video rendering workloads for the video game and the other processes, such as the three-dimensional modeling and rendering software, the video editing software, the machine learning and deep learning, the scientific simulations, and/or the cryptocurrency mining, among others, over the workload completion windows from operation 202. In this example, the operational control flow 200 can identify the process from among the one or more candidate processes with the lowest variance, for example, less than approximately five (5) percent, as being the process that are being executed by the one or more processors to execute the video rendering workloads for the video game. Typically, in this example, the video rendering workloads for the video game is a relatively constant workloads over the workload completion windows from operation 202 with the lowest variance when over the workload completion windows from operation 202 compared to the other processes that are variable workloads having higher variances over the workload completion windows from operation 202.

At operation 206, the operational control flow 200 dynamically provisions a performance state that can be implemented by the one or more processors to execute the identified process from operation 204 to complete the workloads within the specific timeframes from operation 202. In some embodiments, the operational control flow 200 can dynamically provision the performance state having the correct energy-performance tradeoff, as described above, to perform the workloads. In some embodiments, the operational control flow 200 can dynamically provision the performance state for the process from operation 204 that optimizes power consumption and/or performance of the one or more processors while completing the workloads within the specific timeframes in a substantially similar manner as described above. From the example above, the operational control flow 200 can dynamically provision the performance state for the process from operation 204 that executes the video rendering workloads that optimizes power consumption and/or performance of the one or more processors while completing the video rendering workloads within the specific timeframes from operation 202.

At operation 208, the operational control flow 200 determines whether the workloads being performed by the process from operation 204 are deadline-bound workloads. As described above, the workloads being performed by the process from operation 204 can be the deadline-bound workloads or the compute-bound workloads. In some embodiments, the operational control flow 200 can monitor the workloads being performed by the process from operation 204 to determine whether these workloads are the deadline-bound workloads or the compute-bound workloads in a substantially similar manner as described above. The operational control flow proceeds to operation 210 when the workloads being performed by the process from operation 204 are deadline-bound workloads. Otherwise, the workloads being performed by the process from operation 204 are compute-bound workloads and the operational control flow proceeds to operation 212.

At operation 210, the operational control flow 200 performs the workloads in accordance with the performance state from operation 206. The operational control flow 200 can revert to operation 208 to continue to determine whether these workloads being performed by the process from operation 204 are deadline-bound workloads in a substantially similar manner as described above.

At operation 212, the operational control flow 200 switches to utilization-based control for the process from operation 204 to perform the compute-bound workloads in a substantially similar manner as described above. The operational control flow 200 can revert to operation 206 after to once again provision the performance state that can be implemented by the one or more processors to execute the process from operation 204 to complete the workloads within the specific timeframes from operation 202.

Figure 3:
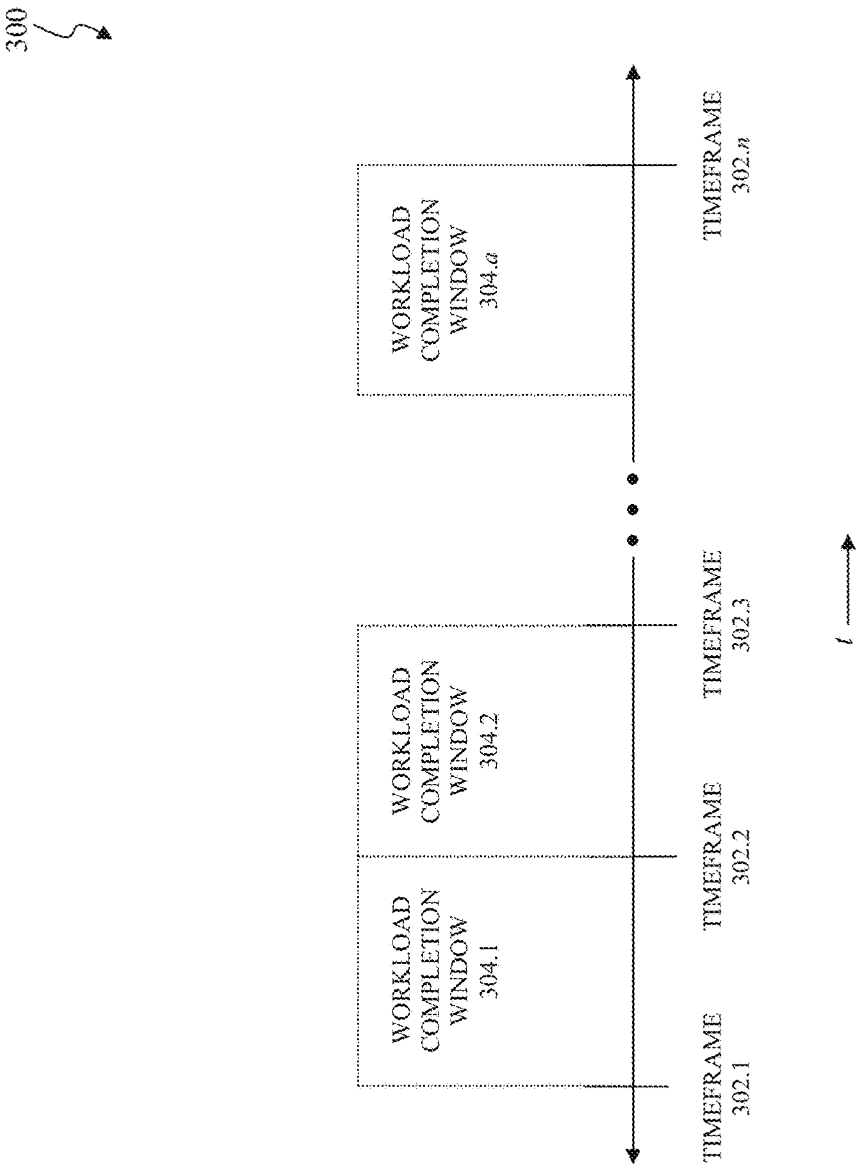
FIG. 3 graphically illustrates exemplary workload completion windows that can be determined by the exemplary CPU in accordance with various embodiments of the present disclosure.

Exemplary Workload Completion Windows that can be Determined by the Exemplary Cpu FIG. 3 graphically illustrates exemplary workload completion windows that can be determined by the exemplary CPU in accordance with various embodiments of the present disclosure. As illustrated in FIG. 3, an exemplary operation 300 can estimate specific timeframes 302.1 through 302.*n* that workloads are to be completed to determine workload completion windows 304.1 through 304.*a*. The exemplary operation 300 can be executed by, for example, the CPU 108 as described above. In some embodiments, the exemplary operation 300 can estimate one or more target performance requirements for the workloads, such as target frame rate, expressed in frames per second (FPS), target frame time, target load time, target latency, target render resolution, target texture quality, target graphic settings, target utilization, and/or target memory usage, among others. In some embodiments, the one or more target performance requirements can impose implicit constraints on the specific timeframes 302.1 through 302.*n* to complete the workloads. In these embodiments, the exemplary operation 300 can utilize these implicit constraints on the specific timeframes 302.1 through 302.*n* to complete the workloads to determine the workload completion windows 304.1 through 304.*a* in a substantially similar manner as described above.

Exemplary Processes that are being Executed by the Exemplary CPU

Figure 4:
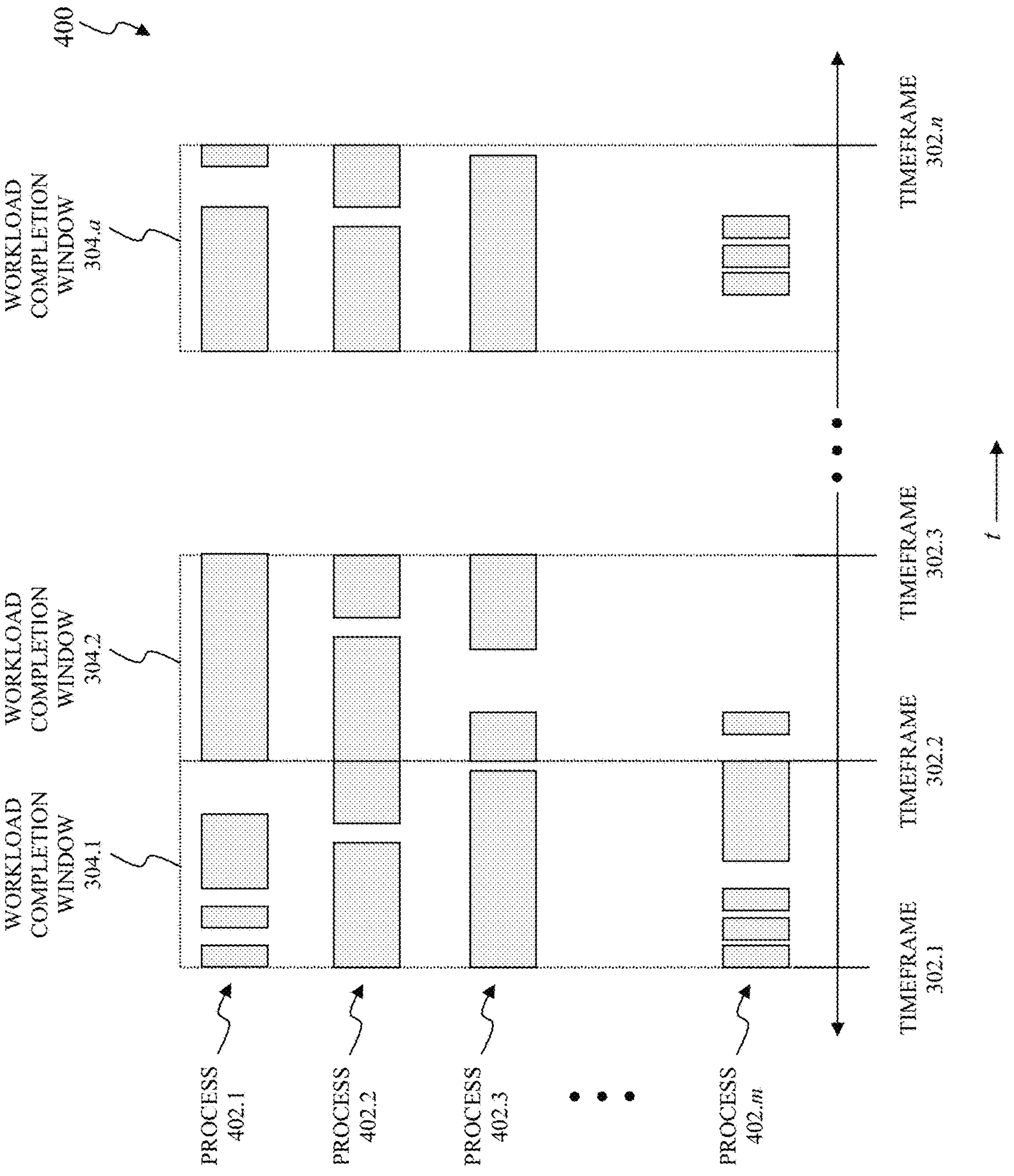
FIG. 4 graphically illustrates exemplary processes that can be executed by the exemplary CPU in accordance with various embodiments of the present disclosure.

FIG. 4 graphically illustrates exemplary processes that can be executed by the exemplary CPU in accordance with various embodiments of the present disclosure. As illustrated in FIG. 4, an exemplary operation 400 can execute one or more processes, tasks, operations, demands, threads, or the like, simply referred to as one or more processes for convenience, to perform workloads that are placed on the resources of the exemplary operation 400. The exemplary operation 400 can be executed by, for example, the CPU 108 as described above. In some embodiments, the exemplary operation 400 can execute multiple processes 402.1 through 402.*m* to perform multiple the workloads over the workload completion windows 304.1 through 304.*a*. These workloads for the multiple processes 402.1 through 402.*m* are illustrated using shading in FIG. 4 for ease of illustration. In these embodiments, the exemplary operation 400 can identify the one or more processes that are being executed by the exemplary operation 400 to perform the workloads from among the multiple processes 402.1 through 402.*m* that are being executed by the exemplary operation 400. In some embodiments, the exemplary operation 400 can analyze the multiple processes 402.1 through 402.*m* to perform the multiple workloads over the workload completion windows 304.1 through 304.*a* to identify one or more candidate processes, such as the processes 402.1 through 402.3 to provide an example, that are representative of the deadline-bound workloads over workload completion windows 304.1 through 304.*a*. In these embodiments, the exemplary operation 400 can estimate the workloads completed by the processes 402.1 through 402.3 over the workload completion windows 304.1 through 304.*a* in terms of, for example, availability, response time, processing speed, channel capacity, latency, completion time, service time, bandwidth, throughput, relative efficiency, scalability, power consumption, and/or compression ratio, among others. As an example, the workloads completed by the processes 402.1 through 402.3 over the workload completion windows 304.1 through 304.*a* are substantially similar, for example, in average workload, to one another. In some embodiments, the exemplary operation 400 can statistically measure the workloads completed by the processes 402.1 through 402.3 over the workload completion windows 304.1 through 304.*a*, in terms of, for example, a mean, a median, a mean square, a root mean square, a variance, and/or a norm, among others, to identify the process 402.2 from among the processes 402.1 through 402.3 that is being executed by the exemplary operation 400 to perform the workloads. In these embodiments, the exemplary operation 400 can compare these statistics for the workloads completed by the processes 402.1 through 402.3 over the workload completion windows 304.1 through 304.*a* with a deadline-bound workloads threshold to identify the processes that is being executed by the exemplary operation 400 to perform the deadline-bound workloads. For example, the deadline-bound workloads can be characterized as having a low variance for the workloads completed over the workload completion windows 304.1 through 304.*a*. In this example, the exemplary operation 400 can identify the process 402.2 from among the processes 402.1 through 402.3 as having the lowest variances, for example, less than approximately five (5) percent, as being executed by the exemplary operation 400 to perform the deadline-bound workloads.

Exemplary Performance States that can be Implemented by the Exemplary Cpu

Figure 5B:
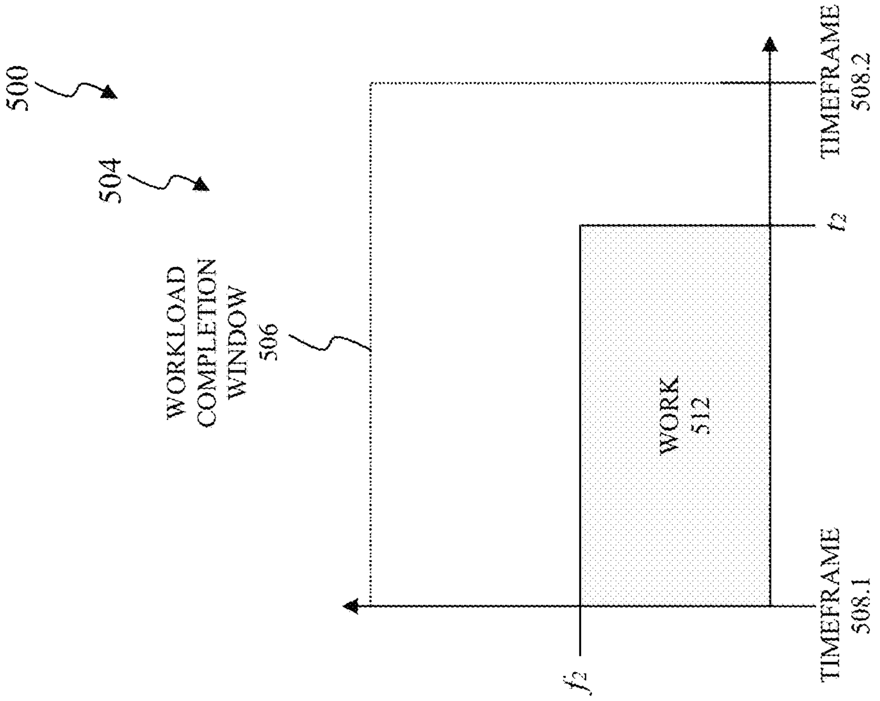
FIG. 5A and FIG. 5B graphically illustrate exemplary performance states that can be implemented by the exemplary CPU in accordance with various embodiments of the present disclosure.
Figure 5A:
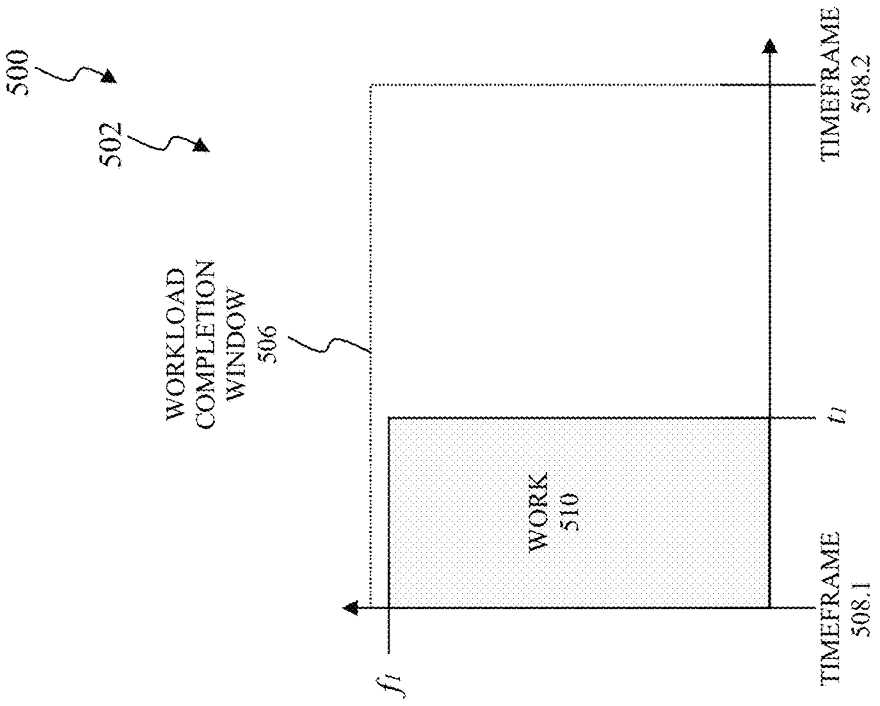

FIG. 5A and FIG. 5B graphically illustrate exemplary performance states that can be implemented by the exemplary CPU in accordance with various embodiments of the present disclosure. As illustrated in FIG. 5A and FIG. 5B, an exemplary operation 500 can dynamically provision the performance state that can be implemented by the exemplary operation 500 to execute the one or more processes to complete the workloads within the specific timeframes. The exemplary operation 500 can be executed by, for example, the CPU 108 as described above. In some embodiments, the exemplary operation 500 can dynamically provision the performance state having the correct energy-performance tradeoff, as described above, to perform the workloads. In some embodiments, the exemplary operation 500 can dynamically provision the performance state for the one or more processes that optimizes power consumption and/or performance of the exemplary operation 500 while completing the workloads within the specific timeframe. FIG. 5A graphically illustrates a first performance state 502 and FIG. 5B graphically illustrates a second performance state 504 that can be provisioned by the exemplary operation 500. The first performance state 502 and the second performance state 504 are for exemplary purposes only and not limiting. Those skilled in the relevant art(s) will recognize that the exemplary operation 500 can be provisioned into other performance states without departing from the spirit and scope of the present disclosure.

As illustrated in FIG. 5A and FIG. 5B, the exemplary operation 500 can estimate specific timeframes 508.1 through 508.2 that the workloads are to be completed to determine a workload completion window 506. The workload completion window 506 can represent an exemplary embodiment of one or more of the workload completion windows 304.1 through 304.*a* as described above. As illustrated in FIG. 5A, the exemplary operation 500 can operate at a first operating frequency $f_1$ to complete the workload at a first time $t_1$ in accordance with the first performance state 502 or at a second operating frequency $f_2$ to complete the workloads at a second time $t_2$ in accordance with the second performance state 504. In some embodiments, the first operating frequency $f_1$ can be greater than the second operating frequency $f_2$ and the first time $t_1$ can be less than the second time $t_2$. In these embodiments, the work performed over the first performance state 502, namely, the product of the first operating frequency $f_1$ and the first time $t_1$ is approximately equal to the work performed over the second performance state 504, namely, the product of the second operating frequency $f_2$ and the second time $t_2$. In these embodiments, an amount of work 510 completed over the workload completion window 506 using the first performance state 502 is approximately equal to the amount of an amount of work 512 completed over the workload completion window 506 by the exemplary operation 500 using the second performance state 504. In these embodiments, the exemplary operation 500 can be provisioned to operate in the second performance state 504 having a lower second operating frequency $f_2$ than the first operating frequency $f_1$ while still completing the workloads within the workload completion window 506. In some embodiments, the second performance state 504 effectively reduces the power consumption of the exemplary operation 500 while still completing the workloads within the workload completion window 506. In these embodiments, a linear decrease in performance, for example, switching from the first performance state 502 to the second performance state 504, can provide a super-linear decrease in the power consumption of the CPU to complete the workloads within the workload completion window 506.

CONCLUSION

Embodiments of the disclosure can be implemented in hardware, firmware, software application, or any combination thereof. Embodiments of the disclosure can also be implemented as instructions stored on one or more computer-readable mediums, which can be read and executed by one or more processors. A computer-readable medium can include any mechanism for storing or transmitting information in a form readable by a computer (e.g., a computing circuitry). For example, a computer-readable medium can include non-transitory computer-readable mediums such as read only memory (ROM); random access memory (RAM); magnetic disk storage media; optical storage media; flash memory devices; and others. As another example, the computer-readable medium can include transitory computer-readable medium such as electrical, optical, acoustical, or other forms of propagated signals (e.g., carrier waves, infrared signals, digital signals, etc.). Further, firmware, software application, routines, instructions have been described as executing certain actions. However, it should be appreciated that such descriptions are merely for convenience and that such actions in fact result from computing devices, processors, controllers, or other devices executing the firmware, software application, routines, instructions, etc.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately executed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan considering the teachings and guidance.

The breadth and scope of the disclosure should not be limited by any of the above-described exemplary embodiments but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A method for operating a Central Processing Unit (CPU), the method comprising:

estimating, by the CPU, a plurality of specific timeframes that a plurality of workloads are to be completed to determine a plurality of workload completion windows;

identifying, by the CPU, a process that is performing the plurality of workloads from among a plurality of processes that are being executed by the CPU over the plurality of workload completion windows;

provisioning, by the CPU, a performance state from among a plurality of different performance states to execute the process to complete the plurality of workloads within the plurality of workload completion windows;

determining, by the CPU, whether the plurality of workloads being performed by the process are a plurality of deadline-bound workloads; and executing, by the CPU based on determining the plurality of workloads are the deadline-bound workloads, the plurality of workloads in accordance with the performance state.

2. The method of claim 1, wherein the estimating comprises identifying the plurality of specific timeframes that coincide with swapping between a visible buffer and a working buffer within a frame buffer of a Graphics Processing Unit (GPU).

3. The method of claim 1, wherein the identifying comprises:

identifying a plurality of candidate processes from among the plurality of processes that are representative of the plurality of deadline-bound workloads over the plurality of workload completion windows;

estimating a plurality of workloads completed by the plurality of candidate processes over the plurality of workload completion windows;

statistically measuring a plurality of variances of the plurality of workloads completed by the plurality of candidate processes over the plurality of workload completion windows; and identifying the process as being a candidate process from among the plurality of candidate processes having a lowest variance from among the plurality of variances.

4. The method of claim 1, wherein the provisioning comprises provisioning the performance state that optimizes power consumption or performance of the CPU while completing the plurality of workloads within the plurality of workload completion windows.

5. The method of claim 4, wherein the provisioning comprises provisioning the performance state that optimizes power consumption or performance of the CPU while completing the plurality of workloads within the plurality of workload completion windows less a deadline margin.

6. The method of claim 1, further comprising:

switching, by the CPU in response to detecting a compute-bound workload, from the performance state to a utilization-based control for the process to perform the compute-bound workload; and executing, by the CPU, the compute-bound workload in accordance with the utilization-based control.

7. The method of claim 6, further comprising provisioning the performance state to execute the process to complete the plurality of workloads within the plurality of workload completion windows in response to completing the compute-bound workload.

8. A computing device, comprising:

a Graphics Processing Unit (GPU) having a visible buffer to store a visible video frame that is being displayed and a working buffer to store a working video frame that is currently being prepared for display by the GPU, the GPU being configured to swap the visible buffer and the working buffer at a plurality of specific timeframes in response to the working video frame being completed; and a Central Processing Unit (CPU) configured to:

estimate the plurality of specific timeframes that a plurality of workloads are to be completed to determine a plurality of workload completion windows, identify a process that is performing the plurality of workloads from among a plurality of processes that are being executed by the CPU over the plurality of workload completion windows, provision a performance state from among a plurality of different performance states to execute the process to complete the plurality of workloads within the plurality of workload completion windows, determine whether the plurality of workloads being performed by the process are a plurality of deadline-bound workloads, and execute, based on determining the plurality of workloads are the deadline-bound workloads, the plurality of workloads in accordance with the performance state.

9. The computing device of claim 8, wherein the CPU is configured to identify the plurality of specific timeframes that coincide with swapping between the visible buffer and the working buffer.

10. The computing device of claim 8, wherein the CPU is configured to:

identify a plurality of candidate processes from among the plurality of processes that are representative of the plurality of deadline-bound workloads over the plurality of workload completion windows;

estimate a plurality of workloads completed by the plurality of candidate processes over the plurality of workload completion windows;

statistically measure a plurality of variances of the plurality of workloads completed by the plurality of candidate processes over the plurality of workload completion windows; and identify the process as being a candidate process from among the plurality of candidate processes having a lowest variance from among the plurality of variances.

11. The computing device of claim 8, wherein the CPU is configured to provision the performance state that optimizes power consumption or performance of the CPU while completing the plurality of workloads within the plurality of workload completion windows.

12. The computing device of claim 11, wherein the CPU is configured to provision the performance state that optimizes power consumption or performance of the CPU while completing the plurality of workloads within the plurality of workload completion windows less a deadline margin.

13. The computing device of claim 8, wherein the CPU is further configured to:

switch, in response to detecting a compute-bound workload, from the performance state to a utilization-based control for the process to perform the compute-bound workload; and execute the compute-bound workload in accordance with the utilization-based control.

14. The computing device of claim 13, wherein the CPU is further configured to provision the performance state to execute the process to complete the plurality of workloads within the plurality of workload completion windows in response to completing the compute-bound workload.

15. A System on Chip (SoC), comprising:

a Graphics Processing Unit (GPU);

a memory; and a Central Processing Unit (CPU) configured to:

estimate a plurality of specific timeframes that a plurality of workloads are to be completed to determine a plurality of workload completion windows, identify a process that is performing the plurality of workloads from among a plurality of processes that are being executed by the CPU over the plurality of workload completion windows, provision a performance state from among a plurality of different performance states to execute the process to complete the plurality of workloads within the plurality of workload completion windows, determine whether the plurality of workloads being performed by the process are a plurality of deadline-bound workloads, and execute, based on determining the plurality of workloads are the deadline-bound workloads, the plurality of workloads in accordance with the performance state.

16. The SoC of claim 15, wherein the CPU is configured to identify the plurality of specific timeframes that coincide with swapping between a visible buffer and a working buffer within a frame buffer of the GPU.

17. The SoC of claim 15, wherein the CPU is configured to:

identify a plurality of candidate processes from among the plurality of processes that are representative of the plurality of deadline-bound workloads over the plurality of workload completion windows;

estimate a plurality of workloads completed by the plurality of candidate processes over the plurality of workload completion windows;

statistically measure a plurality of variances of the plurality of workloads completed by the plurality of candidate processes over the plurality of workload completion windows; and identify the process as being a candidate process from among the plurality of candidate processes having a lowest variance from among the plurality of variances.

18. The SoC of claim 17, wherein the CPU is configured to provision the performance state that optimizes power consumption or performance of the CPU while completing the plurality of workloads within the plurality of workload completion windows less a deadline margin.

19. The SoC of claim 15, wherein the CPU is further configured to:

switch, in response to detecting a compute-bound workload, from the performance state to a utilization-based control for the process to perform the compute-bound workload; and execute the compute-bound workload in accordance with the utilization-based control.

20. The SoC of claim 19, wherein the CPU is further configured to provision the performance state to execute the process to complete the plurality of workloads within the plurality of workload completion windows in response to completing the compute-bound workload.

* * * * *